(12) United States Patent
Smith et al.

(10) Patent No.: US 7,311,249 B2
(45) Date of Patent: Dec. 25, 2007

(54) SYSTEM AND METHOD FOR CONDUCTING A RETURN TRANSACTION FOR A PIN-ACTIVATED ACCOUNT

(75) Inventors: Merrill Brooks Smith, Atlanta, GA (US); Phillip Craig Graves, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 194 days.

(21) Appl. No.: 10/758,429

(22) Filed: Jan. 16, 2004

(65) Prior Publication Data

US 2004/0153402 A1 Aug. 5, 2004

Related U.S. Application Data

(60) Provisional application No. 60/519,629, filed on Nov. 14, 2003, provisional application No. 60/519,630, filed on Nov. 14, 2003.

(51) Int. Cl.
G06K 15/00 (2006.01)
(52) U.S. Cl. ......................... 235/383; 235/379
(58) Field of Classification Search ............... 235/383, 235/379, 380, 382
See application file for complete search history.

(56) References Cited

U.S. PATENT DOCUMENTS

| | | | |
|---|---|---|---|
| 5,577,109 A | 11/1996 | Stimson et al. | |
| 5,918,909 A | 7/1999 | Fiala et al. | |
| 5,930,363 A | 7/1999 | Stanford et al. | |
| 6,000,608 A | 12/1999 | Dorf | |
| 6,032,135 A * | 2/2000 | Molano et al. | 705/41 |
| 6,119,946 A * | 9/2000 | Teicher | 235/492 |
| 6,185,545 B1 | 2/2001 | Resnick et al. | |
| 6,189,787 B1 | 2/2001 | Dorf | |
| 6,208,851 B1 | 3/2001 | Hanson | |
| RE37,122 E | 4/2001 | Levine et al. | |
| 6,282,566 B1 | 8/2001 | Lee, Jr. et al. | |
| 6,285,749 B1 | 9/2001 | Manto | |
| 6,314,171 B1 | 11/2001 | Dowens | |
| 6,315,206 B1 | 11/2001 | Hansen et al. | |
| 6,333,976 B2 | 12/2001 | Lesley | |
| 6,375,073 B1 | 4/2002 | Aebi et al. | |
| 6,424,706 B1 | 7/2002 | Katz et al. | |
| 6,434,379 B1 | 8/2002 | Despres et al. | |
| 6,445,780 B1 | 9/2002 | Rosset | |
| 6,473,500 B1 * | 10/2002 | Risafi et al. | 379/144.01 |
| 6,581,827 B2 | 6/2003 | Welton | |
| 6,588,658 B1 | 7/2003 | Blank | |

(Continued)

OTHER PUBLICATIONS

WIPO, International Search Report dated Mar. 3, 2004, International Patent Application No. PCT/US02/30281, 5 pages.

Primary Examiner—Daniel Stcyr
(74) Attorney, Agent, or Firm—Hunton & Williams LLP (57) ABSTRACT

A system and method for conducting a PIN-enabled stored value account refund transaction is provided. A refund request is received, wherein the refund request is for a stored value account having an associated value purchased in a previous transaction, and the refund request comprises a PIN associated with the stored value account. The refund request may be received by a central processor from a merchant terminal at the request of a customer. The central processor or merchant terminal determine whether any of the associated value has been previously redeemed. A refund amount is determined. The refund amount may be provided to the customer.

60 Claims, 2 Drawing Sheets

U.S. PATENT DOCUMENTS

| | | |
|---|---|---|
| 6,592,035 B2 | 7/2003 | Mandile |
| 6,829,596 B1 * | 12/2004 | Frazee .................. 705/66 |
| 2001/0001856 A1 * | 5/2001 | Gould et al. ............ 705/39 |
| 2001/0042784 A1 | 11/2001 | Fite et al. |
| 2002/0022966 A1 * | 2/2002 | Horgan .................. 705/1 |
| 2002/0077076 A1 | 6/2002 | Suryanarayana et al. |
| 2002/0101966 A1 | 8/2002 | Nelson |
| 2002/0115424 A1 | 8/2002 | Bagoren et al. |
| 2002/0119767 A1 | 8/2002 | Fieldhouse et al. |
| 2002/0133457 A1 | 9/2002 | Gerlach et al. |
| 2003/0194988 A1 | 10/2003 | Knox |
| 2004/0218741 A1 | 11/2004 | Welton |

* cited by examiner

SYSTEM AND METHOD FOR CONDUCTING A RETURN TRANSACTION FOR A PIN-ACTIVATED ACCOUNT

CROSS-REFERENCE TO RELATED APPLICATIONS

This application claims priority to U.S. application Ser. No. 10/253,243 filed Sep. 24, 2002, which claims priority to U.S. Provisional Application No. 60/324,333 filed Sep. 24, 2001 and U.S. Provisional Application No. 60/396,404 filed Jul. 15, 2002, all of which are incorporated herein by reference in their entirety. This application also claims priority to U.S. Provisional Application No. 60/519,630 filed on Nov. 14, 2003 and U.S. Provisional Application No. 60/519,629 filed on Nov. 14, 2003, both of which are incorporated by reference in their entirety.

This application also claims priority to U.S. application Ser. No. 10/712,182 filed Nov. 13, 2003, U.S. application Ser. No. 10/655,828 filed Sep. 5, 2003, and U.S. patent application Ser. No. 10/698,084 filed Nov. 3, 2003, all of which are incorporated herein by reference in their entirety.

This application also claims priority to U.S. application Ser. No. 10/411,971, filed Apr. 11, 2003, which claims priority to U.S. application Ser. No. 09/641,363 filed Aug. 18, 2000, now issued U.S. Pat. No. 6,575,361, which claims priority to U.S. Provisional Application No. 60/149,740 filed Aug. 19, 1999, all of which are incorporated herein by reference.

This application also claims priority to U.S. application Ser. No. 10/732,641 filed Dec. 10, 2003, which is incorporated herein by reference.

This application also claims priority to the U.S. application Ser. No. 10/739,301 filed Dec. 19, 2003, which is incorporated herein by reference.

This application is related to International Application No. PCT/US02/30281 filed Sep. 24, 2002, which is also incorporated herein by reference.

FIELD OF THE INVENTION

This invention relates to PIN-enabled stored value account accounts. More particularly, the invention relates to returning a PIN-enabled stored value account to a merchant and canceling the purchase of a PIN-enabled stored value account. As described in the related applications, the data of a PIN-enabled stored value account may be related to services and/or products paid or prepaid by the owner or end user of the PIN. Each of the PIN-enabled stored value accounts may be associated with an identifier such as a PIN. The PIN and/or identifier may be distributed by a merchant at a point-of-sale.

The technology of this invention is related to the technology of U.S. application Ser. No. 10/732,641 filed Dec. 10, 2003 and U.S. application Ser. No. 10/712,182 filed Nov. 13, 2003, both of which are incorporated herein by reference.

BACKGROUND OF THE INVENTION

Stored value accounts are associated with product and/or service providers. For instance, a stored value account can be associated with wireless telecommunications service providers (sometimes referred to as carriers). For instance, a customer may purchase a $20 PIN to enable $20 of wireless service, wherein the value of the $20 service is stored in and accessed through a stored value account.

Typically, to enable the $20 (or other value) of service, the customer first purchases the PIN (associated with a stored value account), typically at a merchant terminal. The merchant provides the customer with a receipt that includes the PIN. The receipt may also include other information, such as the PIN's associated value and provider. The customer then accesses a central system, such as via an IVR or website, and provides the PIN and the customer's account number to which the PIN's associated value should be added. The central system then adds the value ($20) to the customer's stored value account. The account may be managed by the central system or another provider.

PIN-enabled stored value accounts, such as prepaid long distance phone accounts, are generally used in the telephone industry to allow customers to pre-purchase long distance calling time. Each of the accounts has an identifier such as an identification number (e.g., a PIN) associated with the account. The identifier may be printed on the receipt provided upon purchase of the PIN. Additional associated identification information can be magnetically stored therein or printed in a barcode. The identifier is also stored in a file in a database maintained by the PIN issuer (or central processing system).

Many merchants, such as merchants of physical products, allow customers to return products, for instance during a grace period after purchase. On the other hand, some merchants do not allow product returns. Some merchants require that the product be defective (which may be determined upon inspection), and others allow refunds for any reason whatsoever, leading to increased consumer security. Other merchants may allow returns only after an inspection of the product reveals that the product is in like-new condition. More liberal return policies can lead to increased sales and superior customer relationships because customers are more likely to purchase from a merchant who will refund the purchase price and allow customers to return the product if the customer is unsatisfied in any way.

Return policies may incur costs to the merchant. Customers might damage the product or cause some wear and tear on the product before returning the product, decreasing its value to the merchant. Many merchants require a full inspection of the product after a return, leading to additional shipping and inspection costs. There are also restocking and/or repackaging costs. Many returned products cannot be resold for their full, original price. Instead, merchants often mark down the price to reflect that the product has been "used" or pre-owned, and the difference between the original price and the marked-down price is lost.

Like merchants of physical products, some PIN-enabled stored-value card merchants also allow customers to return stored-value cards. According to the traditional model, the selling merchant could accept the return of the stored-value card at the merchant's discretion. The customer would return the PIN to the merchant, and the merchant would accordingly refund the purchase price of the card to the customer. The return of PIN-enabled stored-value cards differs from the return of traditional physical products because the product is the stored value account, not the physical card per se. Thus, there is typically no danger that the product is physically damaged, since the "product" is information stored in an account.

However, in one traditional model, there is a significant risk that the customer has accessed and/or depleted all or a portion of the stored value account, thereby decreasing (or negating) the value of the product. This risk arises from the fact that at the time of return, the stored-value card merchant does not have access to the card's stored value account information. Thus, the merchant is unable to determine whether the customer had already used all or a portion of the stored value account. By refunding the purchase price to the customer, the merchant bears the risk of loss in the event that the customer had already depleted the value below the refund amount.

Related U.S. Pat. No. 6,575,361 to Graves et. al. ("'361 Patent") discloses another model, which is a system and method for returning a stored-value cards. The '361 Patent is used for physical stored-value card that can be swiped at a terminal. Merchant terminals send return requests to a central processor. Terminals are initially authorized via a "setup card" so that a central processor will recognize and authorize stored-value card-related requests from that terminal. After setup, each request from the terminal includes a terminal identifier, and the central processor authorizes the request if the terminal identifier is a valid identifier for making the particular request.

The card refund process is as follows. A customer purchases a stored-value card from a merchant terminal. If the customer decides he or she does not want the stored-value card, the customer brings the card to another authorized merchant terminal for a return transaction. The merchant terminal inputs the card number at the terminal (such as by swiping the card) and passes the number together with a terminal identifier to the central processor. The central processor determines whether the number corresponds to a stored value account that has not been redeemed, and it also determines whether the terminal was authorized to make the return request. Based on the determination, the central processor sends a return authorization to the merchant terminal, and the merchant terminal may refund the customer in return for the card. The card's PIN is not used in the return process.

It is desirable to provide an improved system and method for returning a PIN after purchase and refunding value associated with the PIN wherein the status of the PIN is verified during the transaction. In this way, merchants can determine whether a PIN-enabled stored value account has been activated or depleted before refunding the purchase price of the stored value account.

SUMMARY OF THE INVENTION

According to one embodiment of the invention, a system and method for conducting a PIN-enabled stored value account refund transaction is provided. A refund request is received, wherein the refund request is for a stored value account having an associated value purchased in a previous transaction, and the refund request comprises a PIN associated with the stored value account. The refund request may be received by a central processor from a merchant terminal at the request of a customer. The central processor or merchant terminal determine whether any of the associated value has been previously redeemed. A refund amount is determined. The refund amount may be provided to the customer.

In another exemplary embodiment, a computer-readable medium encoded with computer program code to conduct a PIN-enabled stored value account refund transaction is provided to accomplish these actions.

In another exemplary embodiment, a system and method for returning a PIN-enabled product is provided. A central processor stores PIN-enabled stored value account information in a database entry. The PIN-enabled stored value account information is associated with a PIN-enabled stored value account that was purchased by a customer, wherein the PIN-enabled stored value account has an associated value. The central processor receives a request to deactivate the PIN-enabled stored value account from a merchant terminal. The central processor determines whether the associated value has been redeemed. Based on its determination, the central processor deactivates the PIN-enabled stored value account. The central processor may pass a deactivation confirmation to the merchant terminal, and the merchant may refund the customer for the price of the PIN-enabled stored value account.

In another exemplary embodiment, a system for conducting a PIN-enabled stored value account refund transaction is provided. The system comprises an input device, a processor, and an output device. The input device is configured to receive a refund request for a stored value account having an associated value purchased in a previous transaction, wherein the request comprises a PIN associated with the stored value account, and wherein the PIN is operative to redeem the associated value. The processor is configured to determine whether any of the associated value has been previously redeemed. The output device is configured to pass a response to the refund request.

DESCRIPTION OF THE DRAWINGS

The present invention can be more fully understood by reading the following detailed description together with the accompanying drawings, in which like reference indicators are used to designate like elements, and in which.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Many wireless telephone users and other recipients of goods and/or services utilize prepaid account arrangements that require payment before services will be provided. It should be understood that prepaid wireless telephone service providers are used herein for exemplary purposes only. The invention relates to any type of prepaid good(s) and/or service(s) that require a PIN or other password or code (collectively referred to as a "PIN") to redeem the product or service.

Examples of prepaid services that may be accommodated by a PIN-enabled stored value account include long distance telephone communication, wireless communication, paging and internet-enabled communication services, including wireless web access, emergency road service, legal service, accounting service, tax service, property cleaning and/or maintenance service, clothe cleaning service, transportation service, travel service, delivery service, online (or off-line) dating service, electrical and/or gas service, water service, sewage service, internet access, and film processing (including digital film processing). Other examples of prepaid services and/or products that may be accommodated by a PIN-enabled stored value account include gift accounts, prepaid gas accounts, prepaid grocery accounts, prepaid entertainment accounts, prepaid movie accounts, downloadable ring tone accounts, downloadable game accounts, downloadable movie accounts, downloadable music accounts that use MP3, MP4, WMV, WAV, or other music formats, any other downloadable software account, customer rewards accounts, bridge and/or road toll accounts, and any other type of PIN-enabled stored value accounts for products, services, or both, that may be prepaid by the owner of the account.

Figure 1:
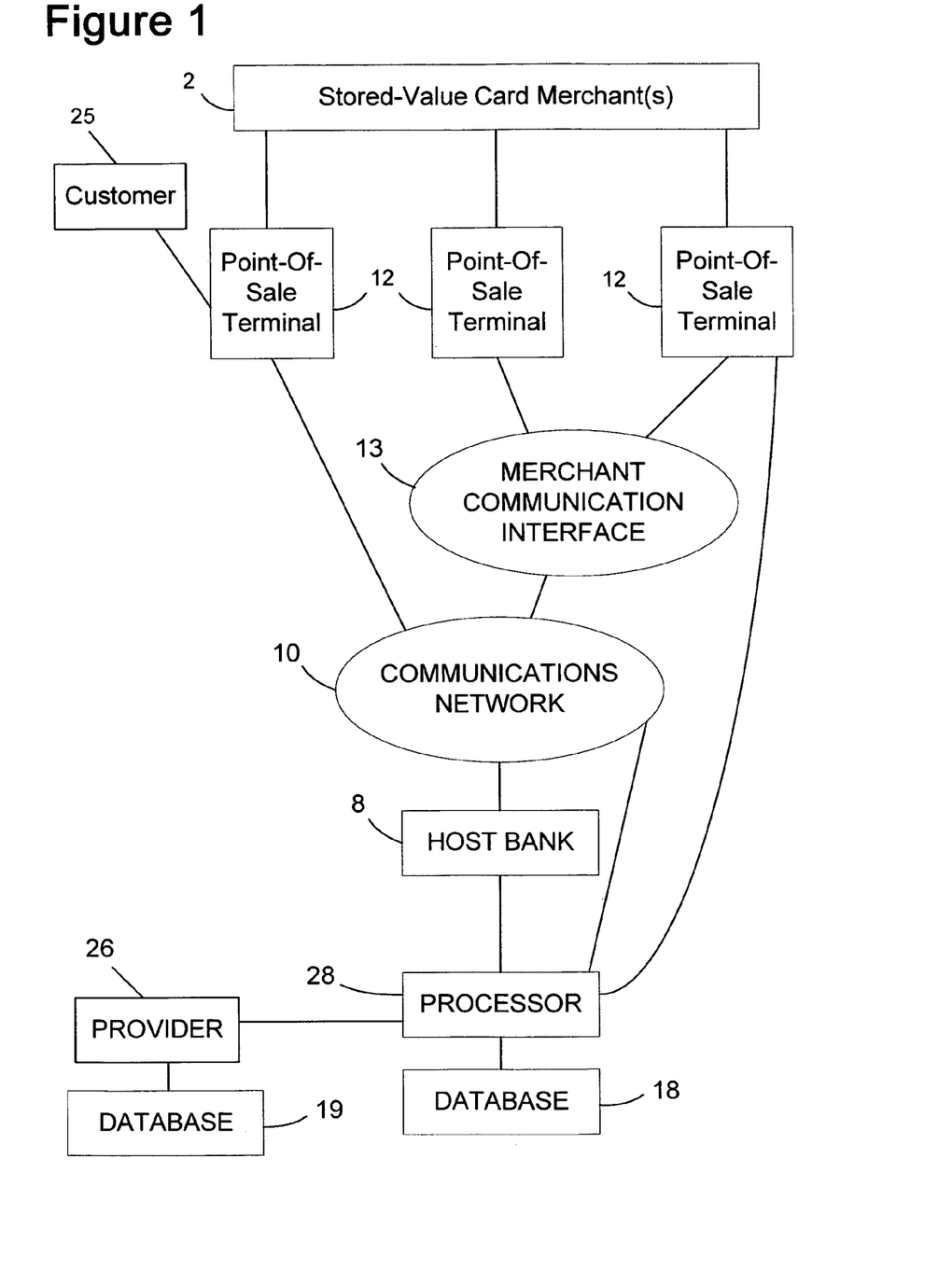
FIG. 1 is a block diagram illustrating a system for canceling a PIN-enabled stored value account transaction according to an embodiment of the invention.

FIG. 1 shows an exemplary user tree and communication path between a merchant terminal 12 and the host bank 8 and central processor 28. The system comprises one or more merchants 2, remote merchant point-of-sale terminals 12 each associated with one or more merchants 2, an optional merchant communication interface 13, a communications network 10, a host bank 8, a central processor 28, a central database 18, a provider 26, and a provider database 19.

The central processor 28 may be coupled to one or more databases 18, which may store information passed from the processor 28. The central processor is configured to receive information, such as information it receives from a terminal 12 or information it accesses at a database 18, 19. The central database 18 may be located at and/or maintained by the central processor 28 (or central processing system). Alternately (or in addition), the central processor 28 may also be coupled to a product or service provider system 26, which may store information in its own database 19. The provider database 19 may be maintained by the provider 26. For instance, a provider 26 may maintain its own database storing stored value account information for its customers, and the central processor 28 may pass customer stored value account information to the providers for storage at their database.

The terminals 12 and central processor 28 are configured to communicate information related to PIN-enabled stored value accounts or accounts, including any information associated with a PIN-enabled stored value account. The terminals 12 and central processor 28 are equipped with appropriate input and output devices for transmitting and receiving information. For instance, the terminals 12 are configured to receive PIN-enabled stored value account requests from customers 25 and pass these (or other) requests to the central processor 28. The central processor 28 is configured to process the requests and pass information back to the terminals 12. The terminal 12 may pass any of the following information to the central processor 28: a request to activate a PIN-enabled stored value account; a request for a PIN associated with a PIN-enabled stored value account; a request to cancel a PIN-enabled stored value account transaction (or return or deactivate a account or PIN); and a request to change the value of a stored value account. The central processor 28 is configured to receive and process the information from the terminal 12 and pass response information to the terminal 12, such as a PIN or a transaction confirmation. For instance, after receiving a request for a PIN, the central processor 28 may pass a PIN to the requesting terminal 12. Additionally, after receiving a request to cancel a PIN transaction (or deactivate a PIN) from a terminal 12, the central processor 28 is configured to process the request and pass a PIN cancellation confirmation to the requesting terminal 12.

The central processor is also configured to communicate with one or more providers 26. The providers may be any provider of one or more goods and/or services. For example, a provider may be a provider of telecommunication service (i.e., a carrier).

The central processor 28 may act as an intermediary between the customers 25, merchants 2 and providers 26. The central processor 28 may maintain arrangements with one or more providers 26 to allow for value insertion, and thereby becomes a broker of prepaid communication services. (The process of value insertion is described in the U.S. application filed Dec. 19, 2003, under Attorney Docket No. 64243.000005, and it is incorporated herein by reference.) The customer 25 is benefited by having access to a resource that can be obtained at several points of sale and allows an easy method to replenish service value for a number of participating providers 26. The providers 26 benefit by having a product in the marketplace whereby customers 25 can more easily replenish customer account balances. Lastly, the merchants 2 may benefit from increased sales because they are selling a product that is in demand because it is a single product that allows customers to select from a number of providers and values.

The central processor 28 may be any central system used to process PIN-enabled stored value accounts and accounts. For instance, the central system 28 may activate the PINs and store information relating to the accounts. For instance, the central processor 28 may store PIN-enabled stored value account data in the database 18. Such information may comprise the account's value, PIN number, merchant store location where the account or PIN was distributed, merchant or merchant terminal identifier, account number, account activity (such as information relating to purchases and other debits and credits), and any other information relating to the PIN-enabled stored value account. The processor 16 may communicate with merchant terminals 12 and process information, such as information received from the terminals 12 and information stored in the database 18.

The merchant communication interface 13 can be connected to any number of point-of-sale terminals 12, which in turn can be connected to any number of merchants. The merchant communication interface 13 may comprise any transmitter, receiver, router, or other intermediate communication device. The merchant communication interface 13 may itself be a point-of-sale terminal 12. For instance, the point-of-sale terminals 12 and the merchant communication interface 13 may be computers connected on a LAN (local area network) or a WAN (wide area network). As illustrated in FIG. 1, communications from multiple merchant terminals 12 may first pass through a merchant communication interface/network hub 13 before the communications leave the merchant and pass through other communications networks 10 such as the internet, a dedicated line, or an outside phone system. Point-of-sale terminals 12 can thus communicate with the host bank 8 and central processor 28 via the communications network 10 and/or communication interface 13.

The remote terminals 12 can be any terminal as disclosed in this or the related applications. For instance, the remote terminals 12 may be a credit card terminal inside a merchant store. The remote terminals 12 may pass information, such as PIN-enabled stored value account information, to and from the communications network 10. The remote terminals 12 may connect to a merchant communication interface/network hub 13. Alternately, the remote terminals 12 may directly connect to the communication network 10 and/or the central processor 28. The communications network 10 may pass information to and from a host bank 8. The host bank 8 and communications network 10 may pass information to and from the central processor 28.

In one aspect of the invention, a central processing system 28 manages the process that would allow the customer 25 to add service value to the customer's account. The central system maintains a set of identifiers (such as Personal Identification Numbers ("PINs")). Each identifier may have an associated service value, which preferably represents a monetary figure (i.e., number of dollars, $10, $25 or $50, for example), or some unit of service usage (i.e., minutes).

The identifiers are provided to customers in PIN-enabled stored value account purchase transactions. A customer requests a particular value and provider. For instance, customers may select a keycard that is associated with a particular value and provider. (The process of selling a PIN-enabled stored value account using a keycard is disclosed in U.S. application Ser. No. 10/712,182 filed Nov. 13, 2003.) The merchant may then request that the central processor provide a PIN to the customer. For instance, the merchant may swipe or otherwise input keycard or other request information at a merchant terminal, and the merchant terminal may pass this (and other) information to a central processor, for instance via a communications network. The central processor receives and processes the request. For instance, the central processor may select and activate a PIN in a database, and it may store information associated with that PIN, such as the store location, value, and provider. The central processor then passes the PIN to the merchant terminal for distribution to the customer. For instance, the PIN may be printed on a receipt that is provided to the customer.

In the cases where the stored value product is used by the customer (and not returned), the customer would follow instructions provided with the indicia and contact the central system to have the service value added to the customer's account. The customer provides the central system with an input representing the identifier that has been activated, as well as the customer's account information. The customer's account information can also be utilized to identify the customer's carrier.

Later, when the identifier and customer account information are verified, the central system communicates with the customer's carrier system to add the service value to the customer's account. Following the service value insertion, the customer's updated account information is obtained and provided to the customer. It should be appreciated that in at least one embodiment of the invention, some carriers do not provide direct service value insertion by the central system directly into the customer's account. For these carriers, an alternate carrier identifier is provided by the system, and the customer is transferred to the carrier system to complete the service value insertion.

In some cases, the customer will return the PIN for any of a variety of reasons. For instance, the customer may return the PIN if the customer failed to purchase a PIN-enabled stored value account associated with the correct provider or value. Ideally, the customer should return the PIN before the customer has redeemed all or a portion of the value associated with the PIN, such as by adding the value to the customer's account and/or using the value (as described above).

In order to return the PIN-enabled stored value account and/or PIN, the customer provides the PIN to the merchant. The merchant terminal passes the PIN to the central processor. The central processor verifies that the PIN has not been redeemed (or added to a customer's account) and passes confirmation information to the merchant terminal. The merchant terminal then cancels the transaction and refunds the purchase amount to the customer.

Figure 2:
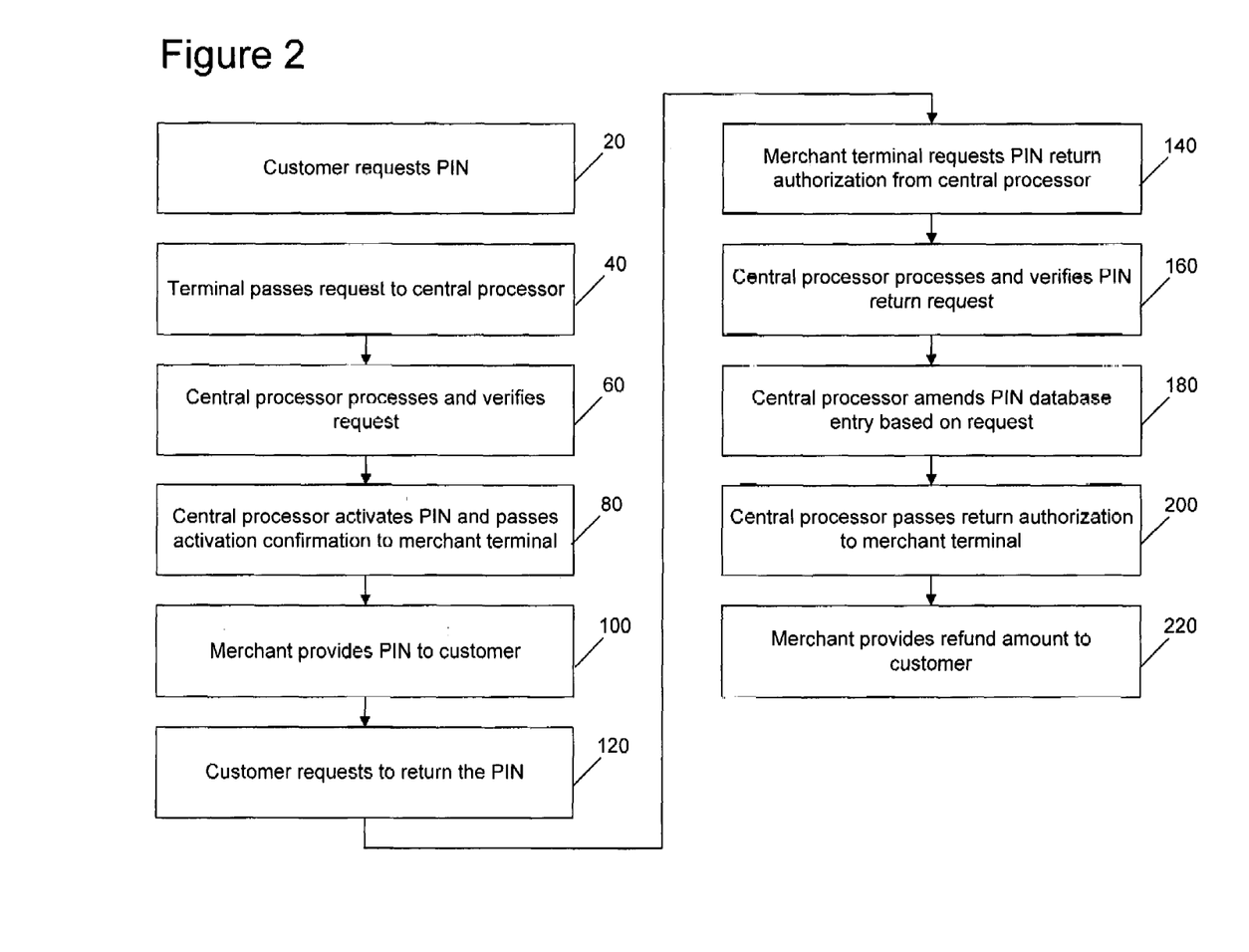
FIG. 2 is a flowchart showing a method for canceling a PIN-enabled stored value account transaction in accordance with one embodiment of the invention.

FIG. 2 shows a flowchart illustrating a method for canceling a PIN-enabled stored value account transaction according to an embodiment of the invention.

In step 20, a customer requests a merchant to activate a PIN-enabled stored value account. This step may comprise a request to activate the PIN itself, which may be associated with the stored value account, value, provider, and/or product or service type. In one embodiment, the customer may request a keycard or otherwise specify a PIN-enabled stored value account request to the merchant. The request may specify a particular value, service, and/or provider for the stored value account, e.g., $20 of downloadable music files from a specific online music vendor. In another embodiment, the customer selects a specific PIN-enabled stored value card that is pre-associated with a PIN and value and brings this card to the merchant for sale.

The keycard may have indicia indicating a value, provider, product or service type, activation information, or other related information. The keycard may also have an indicia that stores information related to the keycard, such as a keycard number or identifier. The indicia may comprise an article, such as magnetic stripe card, smart card, bar coded card, or any combination thereof.

A database at the central processor may store information that associates (and stores) these identifiers (or other indicia information) with other information, such as: the store where the keycard was distributed, the keycard number, one or more PINs that may be associated with a particular keycard type, provider, value, and other information. I.e., each PIN/identifier forms a part of a data record, or identifier record, that allows the central system to identify the service value associated with a particular keycard. The PIN may comprise one field of the identifier record, while another field in the same identifier record may contain the associated service value. Illustratively, record X may have identifier ABC and an associated service value of $25. The service value is preferably a monetary figure (i.e., an amount in dollars, $10, $25 or $50, for example), but may also represent some unit of service usage, if supported by the provider/carrier systems (i.e., minutes).

The set of identifiers forms the identifier database. Each identifier record may also contain fields for Status Indicator (i.e., whether the identifier is Active or Inactive), Serial Number, Visa Account Network Number (VAN), or a Merchant Code identifying the merchant through which the indicia will be distributed.

In step 40, the merchant terminal passes to the central processor a request to activate a PIN. For instance, the merchant may swipe the magnetic stripe or scan the barcode of the keycard at a merchant terminal, and the merchant terminal may pass this information to the central processor.

In step 60, the central processor receives the information and verifies the request. Here, the central processor determines whether the merchant terminal has made an authorized request. The request can be verified one of two ways.

First the request can be verified by determining whether the terminal is a "trusted source" of PIN requests. In a preferred embodiment, the request comprises both a PIN request and a merchant terminal identifier (or merchant identifier). The identifier may comprise a phone number identified by the central processor using automatic number identification. For instance, if the request occurs over a phone line, the central processor may identify the phone number from which the request was made. The identifier may also comprise an internet IP address identified by the central processor. For instance, if the request is made over the internet, the central processor may identify the IP address of the computer which made the request. Here, the merchant terminal may first log into the computer using a password or other login method, and the request may be made through that computer.

Alternately, the identifier may comprise a terminal identifier provided with the request. The terminal identifier may be unique to the terminal (or to the merchant). The central processor receives the identifier with the request and checks whether the identifier corresponds to an authorized merchant terminal (or merchant). For instance, the central processor may access a database that stores authorized identifiers and compare the received identifiers to the authorized identifiers. The central processor may also verify that the received identifier was not only authorized to make PIN requests generally, but authorized to make the specific request. For instance, some terminals may only be authorized to make certain requests, such as requests related to a particular provider or service type.

Alternately, or in addition, the request can be verified by determining whether the communication network used to make the request is a trusted communication network. For instance, if a dedicated data line is used to link a particular merchant's terminals with the central processor (and no one else has access to the data line), then the central processor may determine that any request received over the dedicated data line must be from the authorized merchant, and is therefore an authorized request. I.e., all merchant terminals making requests via the dedicated data line are automatically trusted sources.

A system and method for verifying PIN requests by determining whether a merchant terminal or communication network is a "trusted source" is disclosed in U.S. application Ser. No. 10/655,828 filed Sep. 5, 2003, and it is incorporated herein by reference.

In step 80, the central processor selects and activates a PIN, and passes the PIN to the merchant terminal for distribution to the customer. The PIN may be selected from a database of PINs. For instance, a set of PINs may be pre-associated with a particular value, provider, and product/service type. For instance, a set of PINs may be associated with $30 of wireless phone service provided by Wireless ProviderCo. Alternately, the PINs may not be pre-associated with any provider or value. Instead, a PIN is selected by the processor and then assigned to the provider, value, and product or service type according to the request. Either way, the net result is that the PIN is stored in a database and is associated in the database with such information as a value, provider, product or service type, and an identifier associated with the requesting terminal (or communication network or merchant). The database entry corresponding to the PIN also preferably indicates the status of the PIN. For instance, the entry may indicate whether the PIN is active or inactive, or it may show other status indicators.

The PINs may be activated upon verification of the request, or the PINs may be activated following communication from the merchants that the PIN was distributed to the customer. This measure assists in avoiding the theft of the indicia prior to payment. The activation may include changing a status indicator associated with the specific identifier record from Inactive to Active. The communication between the merchant and central system preferably comprises a "host-to-host or Visanet connection," but may include any network communication wherein the central system receives input from the merchant system confirming the transaction.

The central processor may also create or amend a database entry corresponding to the activated PIN and store information associated with the PIN, such as the value, provider, requesting terminal, and any other information. The central processor may change the status of the PIN, e.g., by amending its database entry to indicate that it is "active".

The central processor also passes an activation confirmation to the merchant terminal. The activation confirmation confirms to the merchant terminal that the PIN was activated. In a preferred embodiment, the activation confirmation includes the PIN. Here, the PIN may be passed to the terminal prior to activation. The terminal receives the PIN and passes it to the customer. The terminal then confirms that the terminal was delivery to the customer (and/or that funds were properly received in consideration for the PIN). Upon receipt of delivery (or payment) confirmation, the central processor may activate the PIN and then pass an activation confirmation to the terminal. Here, passing the PIN and the activation confirmation may collectively be considered an activation confirmation.

In step 100, the merchant terminal provides the PIN to the customer. At this point, the customer has an active PIN that may be redeemed by adding some or all of the associated value to the customer's stored value account with a particular provider. The PIN may be redeemed into a specific account, or the customer may redeem all or a portion of the value directly with any of a plurality of providers by providing the PIN to those providers. In this embodiment, the value need not be redeemed into a single, specific account; instead, a portion of the value may be redeemed with multiple providers.

In step 120, the customer requests to return the PIN (or PIN-enabled stored value account) at a merchant terminal. The request may be a request to refund part or all of the value of the stored value account. For instance, the request may be a request to refund the remaining portion of the value in the account after some of the value was redeemed. In a preferred embodiment, the request is for a full refund.

The merchant terminal may be the same or a different merchant terminal (and the same or different merchant) than the terminal used to purchase the card. The request to return the PIN may be a request for a partial refund of the current amount associated with the PIN. (In one embodiment, the customer may add additional value to the PIN before requesting a refund.)

The customer may request to cancel the original sale transaction and/or request a refund from the merchant for the purchase price of the card. For instance, the request may be a request to un-do or otherwise cancel the prior transaction where the customer purchased the PIN or value in step 20. The customer may request such a return for any reason. For instance, the customer may no longer want the card, the customer may have cancelled the customer's account with the provider, or the customer may have purchased a card associated with the wrong provider.

The request may comprise providing the physical card to the merchant as well as any other physical materials associated with the card, such as the receipt received at purchase and any packaging or instructions provided to the customer at purchase. If the PIN-enabled stored value account is associated with another physical product, the customer may also present the physical product to the merchant. The customer may also provide customer information, such as a driver's license, credit card (such as a credit card used to purchase the PIN-enabled stored value account), or other identification. The customer may represent to the merchant that the PIN-enabled stored value account has not been used, and the customer may provide written statements to that effect.

In step 140, the merchant terminal passes a request to authorize a PIN refund to the central processor. This request may be a request to refund a PIN and/or a stored value account. The request may be a request to authorize a refund, such as a request to authorize the merchant terminal to provide a refund of the customer in the amount of the customer's purchase price (plus or minus fees, taxes, etc.).

This step comprises inputting information at the merchant terminal. The information may comprise the PIN, the value, the purchase price, and/or other information associated with the PIN-enabled stored value account. The information may be input by the merchant or the customer at the merchant terminal.

Additionally, in a preferred embodiment, the customer enters the PIN at the merchant terminal, such as a keypad attached to a credit card reader. Alternately, the merchant may enter the PIN at the merchant terminal. For verification purposes, the customer may be required to enter the PIN twice. The merchant terminal may not pass the request to the central processor unless the PIN entered the first time matches the PIN entered the second time, which minimizes typographical errors. Alternately, the central processor may later verify that the two entries of the PIN are identical, which indicates that the PIN was entered correctly.

The request may comprise a request to deactivate, suspend, or otherwise invalidate the account. The request may comprise the information input at the terminal, such as the account number and the PIN. This step may occur automatically and/or in conjunction with step S100. For instance, after the necessary information is entered at the terminal, the merchant (or customer) may press a button or otherwise cause the information to be transmitted to the central processor.

In step 160, the central processor receives and processes the terminal's refund request. Here, the central processor determines the status of the stored value account corresponding to the account. In a preferred embodiment, the central processor determines whether the PIN (or associated value) has been redeemed.

In this step, the central processor accesses the database corresponding to PIN information received from the merchant terminal in the request to cancel. The database could be either a local database (maintained by the central processor) or a remote database, such as a database of a provider. The central processor determines the status of the PIN-enabled stored value account. The central processor may determine whether the PIN is active or inactive, whether the PIN is expired, and/or whether the PIN has been redeemed (and to what extent the value has been redeemed). The central processor may also determine any other information associated with the PIN, such as the value and the date on which the PIN was activated.

For instance, the central processor may determine that the PIN has been activated in a prior purchase transaction, and that the PIN has never been used. In this case, the PIN may be deactivated, and the central processor may pass a return authorization to the merchant terminal indicating that the PIN should be refunded. The return authorization may also comprise the amount that should be refunded. The PIN may not be deactivated when the customer requests only a partial refund. Also, the central processor (and/or merchant) may deny a refund request if all or a portion of the value associated with PIN has been previously redeemed. In this case, the PIN may stay active.

The central processor may also access billing information associated with the PIN. For instance, the central processor may determine whether there is a positive or negative billing record associated with the PIN, e.g., a credit or a debit associated with payment for the PIN between or among the merchant, customer, central processor (or affiliated entity), and provider. The billing entry may depend on whether the appropriate parties have paid the appropriate amount to other parties as a result of the sale of the PIN. A positive billing entry may exist if one party, such as the merchant who sold the PIN to the customer, owes money to another party, such as the PIN distributor (which may be affiliated with the central processor). Such billing arrangements depend on the agreements between the PIN distributors, merchants, customers, and providers. The billing information may be stored in a database, such as in the entry corresponding to the PIN information.

In step 180, based on the determination of the status of the PIN, the central processor may edit the PIN and/or stored value account entry. For instance, the central processor may deactivate or otherwise cancel the PIN. For instance, the central processor may also edit the billing information to indicate a negative billing entry, meaning that because the stored value has been returned, a credit (or debit) is owed in the reverse direction as in a positive entry. For instance, if a positive entry indicates that the merchant owes the PIN distributor for the agreed price of the PIN, a negative entry may mean that the PIN distributor owes the merchant in the same amount. These entries may be used for record-keeping purposes, and the billing records may be reconciled in real time or at the end of a billing cycle or other time frame.

All billing information may be stored in the database, including the billing history. For instance, the database may store information indicating that a particular PIN-enabled stored value account had a positive billing entry and then later an additional billing entry (such as a negative billing entry). In other words, amending a billing entry (or other PIN entry) may not necessarily erase prior information.

The central processor may re-enable the identifier (PIN) so that it can be used again. For instance, it may become associated with another stored value account (or the same account when later provided to the same or a different PIN purchaser). The central processor may also cancel the PIN permanently (or temporarily) so that the PIN cannot enable any value that may be associated with the PIN/account.

In steps 160 and 180, the central processor effectively determines an authorization result in response to the terminal's request. The result may be a refund amount or a positive or negative response (indicating that a refund should or should not be provided to the customer, respectively). The result may be any response as described above.

In step 200, the central processor passes the authorization result to the merchant terminal. This may comprise an authorization to refund the customer's funds. It may comprise a cancellation confirmation, e.g., a confirmation that the PIN- and/or stored value account has been deactivated and/or cancelled. The authorization result may comprise a simple authorization or denial which either authorizes or denies the authorization and/or refund request. The authorization result may also comprise more detailed information about the PIN, such as its purchase price, initial associated value, current associated value, purchase or activation date, status, account number, or other information.

In step 220, based on the information received from the central processor, the merchant may accept the return of the PIN-enabled stored value account. The merchant terminal may also provide a receipt or other confirmation that the sale of the PIN-enabled stored value account was cancelled (or partially cancelled or refunded). For instance, if the information received from the central processor indicates that the PIN value has not yet been accessed or redeemed (or that the PIN account has not been activated or accessed), the merchant may accept the return of the PIN (and/or refund the customer for the purchase price or a portion thereof). If the PIN has already been either partially or fully redeemed, the merchant may deny (or fulfill) the customer's request to return the PIN-enabled stored value account.

If the merchant allows the customer to return the PIN, the merchant may refund the purchase price to the customer. The merchant may make records indicating that the PIN was returned. The merchant may also send a confirmation back to the central processor indicating that the PIN was successfully returned.

The process described above may also occur without the aid of the central processor. For instance, the merchant terminal may access the stored value account directly at a database (e.g., via a website or other means of accessing information) and determine whether to refund the PIN value. The merchant terminal could then directly amend the account information to indicate whether the account has been deactivated (i.e., whether the PIN-enabled stored value account was successfully returned and the sale was cancelled). Alternately, such steps may require a central processor to the extent that a central processor must be accessed to retrieve or modify stored value account and/or PIN information.

It should be appreciated that the PIN may be fully or partially refunded. For instance, a customer who purchases a $20 card and uses $10 of the associated value may return the card and obtain a $10 refund.

Alternately, a customer may refund only a portion of the remaining value. In this case, the PIN may remain active.

The present invention can be embodied in the form of computer-implemented processes and apparatus for practicing the processes described above. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method of conducting a PIN-enabled stored value account return transaction, comprising:
   receiving a return request for an activated stored value account having an associated value purchased in a previous transaction, wherein the return request comprises information associated with the PIN-enabled stored value account, and wherein a PIN is associated with the stored value account and is operative to credit a customer account with a provider of goods or services with the associated value;
   determining whether the associated value has been credited to the customer account;
   providing a response to the return request;
   determining a refund amount, comprising:
      responsive to a determination that the none of the associated value has not been credited to the customer account, setting the refund amount equal to the associated value; and
      responsive to a determination that any portion of the associated value has been credited to the customer account, setting the refund amount to zero;
   deactivating the stored value account and associated PIN upon a determination that the value has not been credited to the customer account; and
   making the stored value account available for resale.

2. The method of claim 1, wherein the response includes the refund amount.

3. The method of claim 1, further comprising:
   determining an authorization result; and
   preparing the response, wherein the response includes the authorization result.

4. The method of claim 3, wherein the action of determining an authorization result includes:
   responsive to a determination that the associated value has not been credited to the customer account, setting the authorization result to include a positive return authorization; and
   responsive to a determination that the value has been credited to the customer account, setting the authorization result to include a negative return authorization.

5. The method of claim 1, further comprising:
   storing information associated with the stored value account in a database entry.

6. The method of claim 5, further comprising:
   amending the database entry to indicate that the stored value account is deactivated.

7. The method of claim 1, further comprising:
   crediting a merchant for an amount associated with the stored value account by a central processor, wherein the merchant sold the associated value to the customer in the previous transaction, and wherein the amount was previously owed by the merchant as a result of the previous transaction.

8. The method of claim 1, further comprising:
   providing the refund amount to a customer, wherein the customer purchased the stored value account in the previous transaction.

9. The method of claim 1, further comprising:
   deactivating the PIN.

10. The method of claim 1, further comprising:
    deactivating the stored value account by a central processor.

11. The method of claim 1, wherein the return request is received by a merchant terminal from a customer.

12. The method of claim 1, wherein the return request is received by a central processor from a merchant terminal.

13. The method of claim 12, wherein the return request comprises an identifier associated with the merchant terminal, further comprising:
   determining by the central processor whether the merchant terminal is authorized to make a return request based on the identifier.

14. The method of claim 12, wherein the return request is received over a telephone network from a phone number identified using automatic number identification, further comprising:
   determining by the central processor whether the merchant terminal is authorized to make a return request based on the identified phone number.

15. The method of claim 12, wherein the return request is received over the internet from an IP address identified by the central processor, further comprising:
   determining by the central processor whether the merchant terminal is authorized to make a return request based on the identified IP address.

16. The method of claim 12, wherein the return request is received over a dedicated data line.

17. The method of claim 1, wherein the associated value is redeemable for internet access.

18. The method of claim 1, wherein the associated value is redeemable for film processing.

19. The method of claim 1, wherein the stored value account is a gift account.

20. The method of claim 1, wherein the stored value account is a prepaid gas account.

21. The method of claim 1, wherein the stored value account is a prepaid grocery account.

22. The method of claim 1, wherein the stored value account is a prepaid entertainment account.

23. The method of claim 1, wherein the stored value account is a prepaid movie account.

24. The method of claim 1, wherein the stored value account is a downloadable ring tone account.

25. The method of claim 1, wherein the stored value account is a downloadable game account.

26. The method of claim 1, wherein the stored value account is a downloadable movie account.

27. The method of claim 1, wherein the stored value account is a downloadable music account.

28. The method of claim 1, wherein the stored value account is a downloadable music account that uses at least one of MP3, MP4, WMV, and WAV music formats.

29. The method of claim 1, wherein the stored value account is a customer rewards account.

30. The method of claim 1, wherein the stored value account is at least one of a bridge and road toll account.

31. The method of claim 1, wherein the associated value is redeemable for long distance telephone communication.

32. The method of claim 1, wherein the associated value is redeemable for wireless communication.

33. The method of claim 1, wherein the associated value is redeemable for wireless telephone service.

34. The method of claim 1, wherein the associated value is redeemable for paging services.

35. The method of claim 1, wherein the associated value is redeemable for internet-enabled communication services.

36. The method of claim 1, wherein the associated value is redeemable for wireless web access.

37. The method of claim 1, wherein the associated value is redeemable for emergency road service.

38. The method of claim 1, wherein the associated value is redeemable for at least one of legal service, accounting service, and tax service.

39. The method of claim 1, wherein the associated value is redeemable for transportation service.

40. The method of claim 1, wherein the associated value is redeemable for online dating services.

41. A method of conducting a stored value account return transaction, comprising:
   receiving from a customer a request to return an activated stored value account purchased in a prior transaction, wherein the request comprises information associated with the PIN-enabled stored value account, wherein a PIN is associated with the stored value account and is operative to credit a customer account with a provider of goods or services with the associated value;
   determining whether the associated value has been credited to the customer account;
   determining whether to refund the stored value account based on the determining action;
   refunding the associated value responsive to a determination that the none of the associated value has been credited to the customer account;
   deactivating the stored value account upon a determination that the none of the associated value has not been credited to the customer account; and
   making the stored value account available for resale.

42. The method of claim 41, wherein the refund is a partial refund.

43. The method of claim 41, wherein the refund is a full refund.

44. The method of claim 41, further comprising:
   responsive to a determination that the associated value has been credited to the customer account, denying the customer request.

45. The method of claim 41, wherein the refunding action comprises providing money to the customer.

46. The method of claim 41, wherein the request comprises entering the PIN at a merchant terminal.

47. The method of claim 41, wherein the request comprises entering the PIN at a merchant terminal twice.

48. A method of conducting a stored value account return transaction, comprising:
   storing stored value account information in a database entry, wherein the stored value account information is associated with an activated stored value account, the stored value account has an associated value that was purchased by a customer in a prior transaction;
   receiving a return request for the stored value account, wherein the request comprises a PIN associated with the stored value account, and wherein the PIN is operative to credit a customer account with a provider of goods or services with the associated value;
   receiving a request to deactivate the stored value account from a first merchant terminal;
   determining whether the associated value has been credited to the customer account;
   deactivating the stored value account based on the determining action; and
   responsive to a determination that none of the associated value has been credited to the customer account, offering the stored value account for resale.

49. The method of claim 48, further comprising:
   passing a deactivation confirmation to the first merchant terminal.

50. The method of claim 48 wherein the prior transaction comprises distributing a PIN to a second merchant terminal for distribution to the customer.

51. The method of claim 50, wherein the first merchant terminal and the second merchant terminal are identical.

52. The method of claim 48, further comprising:
amending the database entry based on the determining step.

53. A method of conducting a stored value account return transaction, comprising:
receiving from a merchant terminal a return request for an activated stored value account having an associated value purchased in a previous transaction, wherein the request comprises a PIN associated with the stored value account, the PIN is operative to redeem the associated value, and the request is based on a request for a refund by the customer;
determining whether the associated value has been credited to a customer account with a provider of goods or services; and
passing an authorization response to the merchant terminal based on the determining action, comprising an indication that the value has not been credited to the customer account;
responsive to a determination that none of the associated value has been credited to the customer account, deactivating the stored value account and offering the stored value account for resale.

54. The method of claim 53, where the authorization response comprises an indication that the value has been credited to the customer account.

55. The method of claim 53, wherein the authorization response comprises an authorization to provide a refund to a customer, wherein the customer purchased the PIN in the prior transaction.

56. The method of claim 53, wherein the request to determine whether the associated value has been credited to the customer account comprises an identifier.

57. A method of conducting a stored value account return transaction, comprising:
selling a PIN to a customer, wherein the PIN is activated and associated with a value, and wherein the PIN is operative to credit the associated value to a customer account with a provider of goods or services;
receiving from the customer a request for a refund, wherein the request comprises the PIN;
determining whether the associated value has been credited to the customer account;
determining whether to provide a refund to the customer based on the determining action; and
responsive to a determination that none of the associated value has been credited to the customer account, deactivating the stored value account and offering the stored value account for resale.

58. A system for conducting a PIN-enabled stored value account return transaction, comprising:
an input device for receiving a return request for an activated stored value account having an associated value purchased in a previous transaction, wherein the request comprises a PIN associated with the stored value account, and wherein the PIN is operative to credit a customer account with a provider of goods or services with the associated value;
a processor for determining whether the associated value has been credited to the customer account and for deactivating the stored value account upon a determination that none of the associated value has been credited to the customer account; and
an output device for passing a response to the return request.

59. A computer-readable medium encoded with computer program code to conduct a stored value account return transaction, the program code effective to perform the following:
receive a return request for an activated stored value account having an associated value purchased in a previous transaction, wherein the request comprises a PIN associated with the stored value account, and wherein the PIN is operative to credit a customer account with a provider of goods or services with the associated value;
determine whether the associated value has been credited to the customer account; and
determine a refund amount for the stored value account; and
responsive to a determination that none of the associated value has been credited to the customer account, deactivate the stored value account.

60. A method of conducting a PIN-enabled stored value account return transaction, comprising:
receiving a return request for an activated stored value account having an associated value provided other than by purchase in a previous transaction, wherein the request comprises a PIN associated with the stored value account, and wherein the PIN is operative to credit a customer account with a provider of goods or services with the associated value;
determining whether the associated value has been credited to the customer account;
providing a response to the return request; and
responsive to a determination that none of the associated value has been credited to the customer account, deactivating the stored value account and offering the stored value account for resale.

* * * * *

UNITED STATES PATENT AND TRADEMARK OFFICE
CERTIFICATE OF CORRECTION

| | | |
|---|---|---|
| PATENT NO. | : 7,311,249 B2 | Page 1 of 1 |
| APPLICATION NO. | : 10/758429 | |
| DATED | : December 25, 2007 | |
| INVENTOR(S) | : Merrill Brooks Smith et al. | |

It is certified that error appears in the above-identified patent and that said Letters Patent is hereby corrected as shown below:

Col. 14, line 17 after "value has" delete [not].

Signed and Sealed this

Fifteenth Day of April, 2008

JON W. DUDAS
*Director of the United States Patent and Trademark Office*